United States Patent [19]
Lizenby

[11] Patent Number: 5,223,158
[45] Date of Patent: Jun. 29, 1993

[54] NUT CASTING APPARATUS

[75] Inventor: Kevin J. Lizenby, Traverse City, Mich.

[73] Assignee: Tranket, Incorporated, Traverse City, Mich.

[21] Appl. No.: 786,559

[22] Filed: Nov. 1, 1991

Related U.S. Application Data

[62] Division of Ser. No. 608,695, Nov. 5, 1990, Pat. No. 5,152,948.

[51] Int. Cl.$^5$ .............................................. B29D 1/00
[52] U.S. Cl. ........................................ 249/59; 249/63; 249/175
[58] Field of Search ...................... 249/59, 63, 52, 42, 249/142, 175

[56] References Cited

U.S. PATENT DOCUMENTS

| | | | |
|---|---|---|---|
| 505,778 | 9/1893 | Rouse | 249/59 |
| 1,227,680 | 5/1917 | Segre | 249/59 |
| 1,916,692 | 7/1933 | Scribner | 249/59 |
| 1,944,571 | 1/1934 | Rahm | 249/59 |
| 1,959,612 | 5/1932 | Burke | 249/59 |
| 2,133,019 | 10/1938 | Campbell | 249/59 |
| 3,054,145 | 9/1962 | Helpa | 249/59 |
| 3,387,323 | 6/1968 | Wyllie et al. | 249/63 |
| 4,622,198 | 11/1986 | Gallusser et al. | 249/59 |

FOREIGN PATENT DOCUMENTS 2-118961  5/1987  Japan ................... 249/59

Primary Examiner—Jay H. Woo
Assistant Examiner—Duane S. Smith
Attorney, Agent, or Firm—Reising, Ethington, Barnard, Perry & Milton

[57] ABSTRACT

An apparatus for casting polymer threads (32) in a nut cavity (14) complementary to the threads (44) of a casting screw (42) to minimize the formation of air pockets and air bubbles in the polymer threads. The cavity (14) of the nut (12) has a diameter larger than the diameter of the casting screw (42). The threads (32) of the nut (12) are formed in a polymer (30) which is dispensed into the nut cavity (14) and which cures around the threads (44) of the casting screw (42) after the screw is inserted into the cavity of the nut. The nut casting apparatus (10) includes support member (54) for closing the bottom of the cavity (14), and for containing the polymer (30) therein.

24 Claims, 3 Drawing Sheets

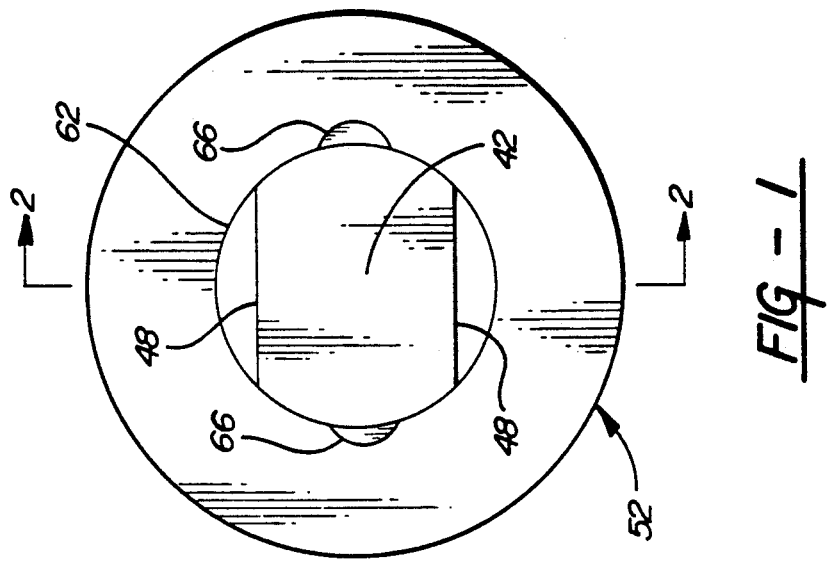
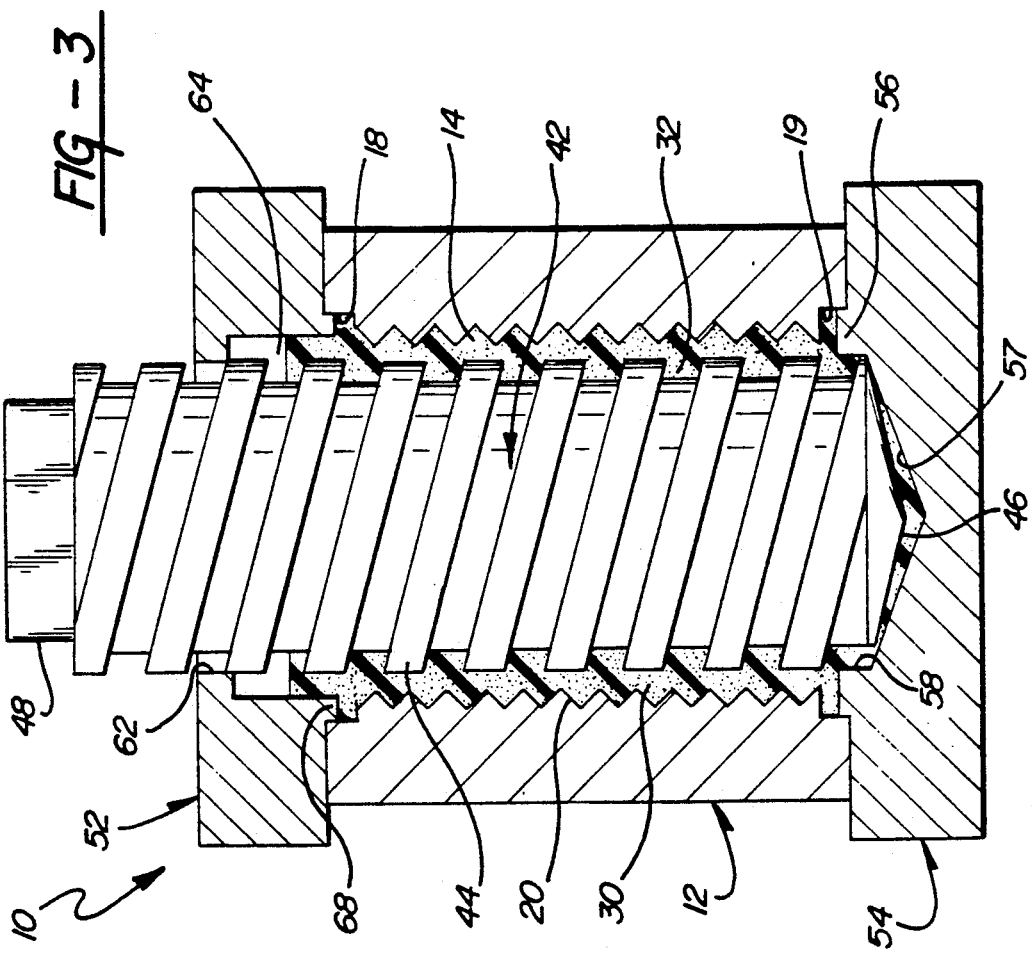

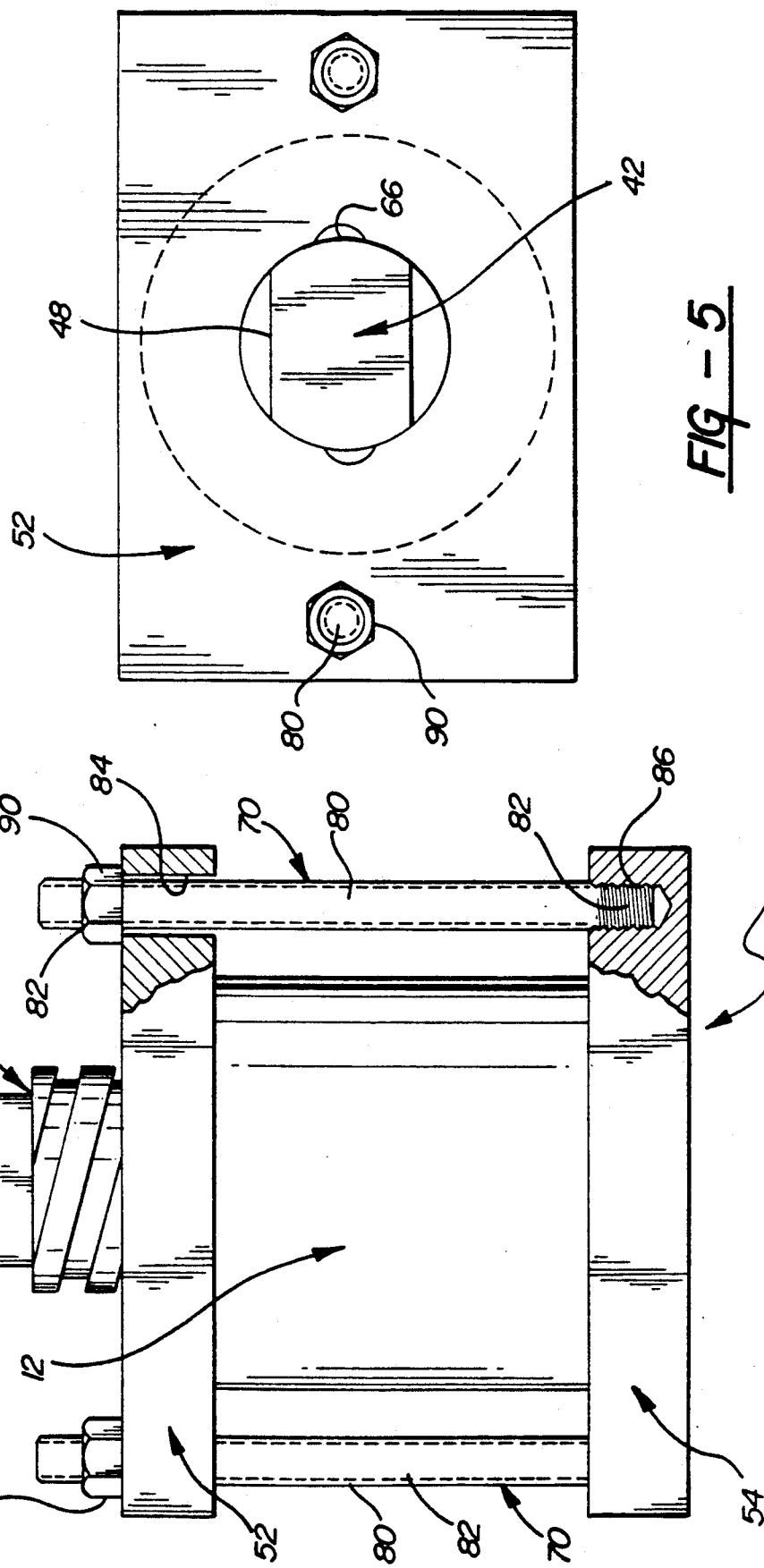

NUT CASTING APPARATUS

This application is a divisional of application Ser. No. 608,695, filed Nov. 5, 1990 now U.S. Pat. No. 5,152,948.

TECHNICAL FIELD

The subject invention relates to long span lead screw and nut drive shuttle systems, and particularly to a method and apparatus for forming threads in a polymer insert in the nut which are complementary to the threads on the lead screw.

BACKGROUND ART

A shuttle device utilizing a long span lead screw and nut drive has been used to transmit heavy torque and thrust loads at relatively high speeds. One such device is shown in U.S. Pat. No. 3,670,583 in the name of John C. Lemming, which includes a non-rotatable coactive nut operatively mounted on a rotary screw and adapted to travel freely linearly along the screw. The problem with conventional lead screw and nut drive assemblies is that the nut threads have to be machined to match the threads of the lead screw. At high speeds, the nut drive and lead screw may vibrate due to the tolerance between the lead screw and nut drive threads. Also, misalignment of the nut drive and lead screw may occur due to the machine intolerances of the threads of the nut drive. Further, large amounts of power are required to drive various loads due to the short lead in a single start.

U.S. Pat. No. 4,790,971 to Brown et al teaches a method of casting nut threads, and a corresponding apparatus, to minimize such problems. The method involves forming polymer threads in the cavity of a nut complementary to the threads on a section of the lead screw. The threads are formed by centering a section of the screw in a nut having a cavity with a diameter larger than the diameter of the screw threads, by filling the cavity with a liquid polymer and by allowing the polymer to dry and cure around the threads of the lead screw.

Unfortunately, when the polymer is introduced into the nut cavity around the threads of the lead screw section, air pockets and air bubbles form as a part of the threaded polymer insert. The presence of air pockets and air bubbles in the polymer insert affects not only the life of the threaded polymer insert but also the mechanical strength of the polymer insert.

SUMMARY OF THE INVENTION AND ADVANTAGES

An improved method of forming threads on the interior cavity extending through a nut for engaging a multi-start high helix lead screw of a nut drive and lead screw assembly comprises the following steps: closing the bottom of the cavity of the nut to render the bottom fluid-tight; thereafter filling the cavity of the nut with a viscous polymer material; thereafter inserting a casting screw having the threads thereabout into the cavity to displace the polymer material to a higher level in the cavity; and curing the polymer material and forming the high helix multiple threads of the nut complementary to the threads of the casting screw for providing polymer nut threads having no air bubbles or open pockets.

Corresponding with this new method is a nut casting apparatus for forming threads on the interior cavity extending through a nut for engaging a multi-start high helix lead screw of a nut drive and lead screw assembly comprising a nut having an interior cavity extending through the nut. The assembly is characterized by cavity closing means for temporarily extending across the bottom end of the cavity and rendering the bottom end fluid tight.

Accordingly, the subject method and apparatus for casting the polymer nut threads allow suitable threads to be cast while reducing the number of air bubble and air pocket imperfections in the polymer nut thread casting.

FIGURES IN THE DRAWINGS

Other advantages of the present invention will be readily appreciated as the same becomes better understood by reference to the following detailed description when considered in conjunction with the accompanying drawings wherein:

FIG. 1 is a top view of the nut casting assembly showing the upper screw support member and the screw;

FIG. 3 is a cross-sectional view similar to FIG. 2, showing the polymer threads and the casting screw;

FIG. 4 is a side view partially cut away showing the nut, the screw, the upper and lower screw support members and retaining means; and FIG. 5 is a top view showing the upper support member, the screw and the retaining means.

DESCRIPTION OF THE PREFERRED EMBODIMENT

Figure 2:
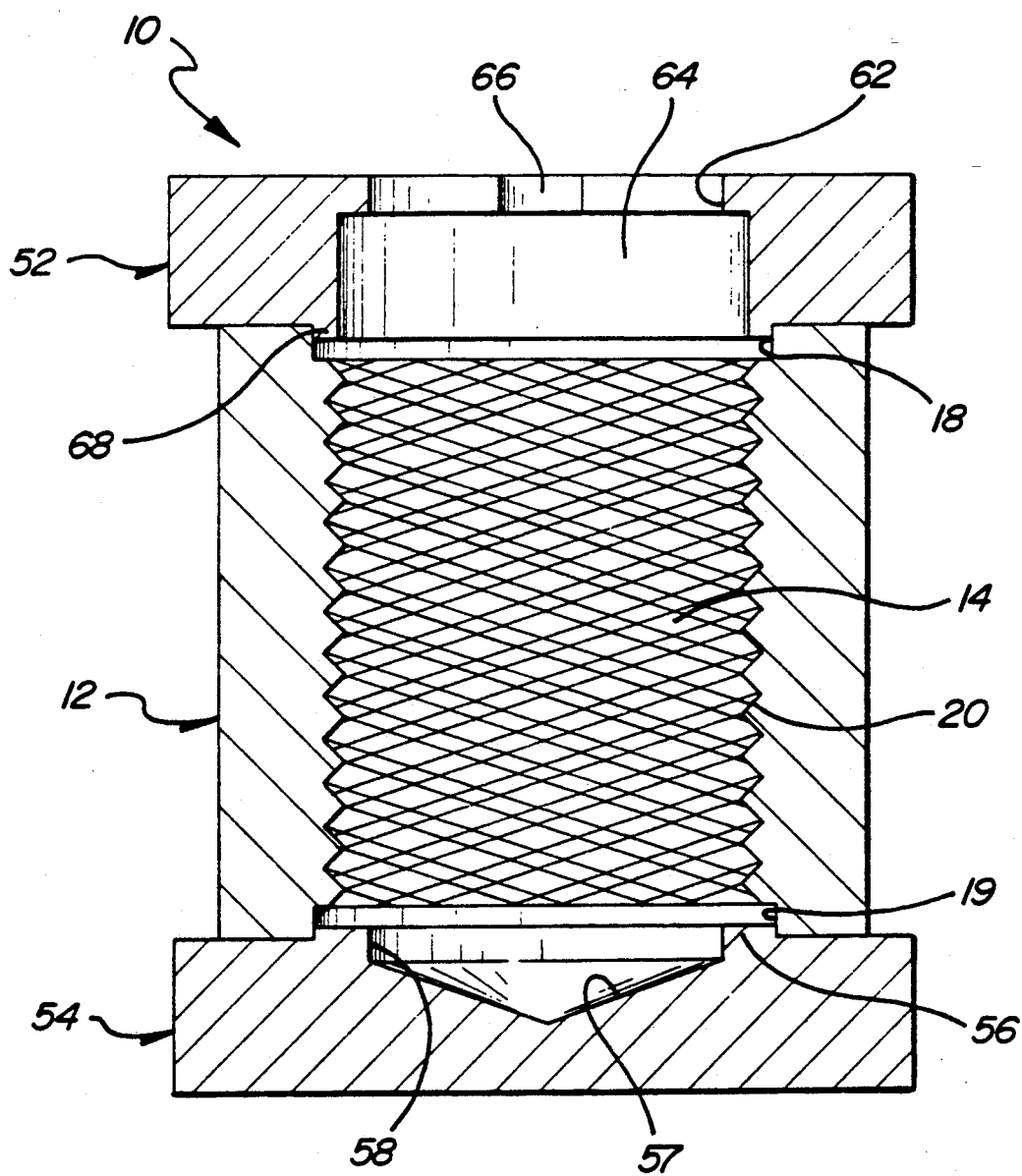
FIG. 2 is a cross-sectional view taken along line 2—2 of FIG. 1 showing the nut and the upper and lower screw support members.

A nut casting apparatus for facilitating the nut casting method is generally shown at 10 in the figures. The apparatus 10 includes a nut generally indicated at 12, a cavity closing means generally indicated at 54, a polymer 30, a polymer retaining means 20, a casting screw generally indicated at 42 and screw support means generally indicated at 52, 54.

The nut casting apparatus 10 includes a nut generally indicated at 12 having an interior cavity 14 extending through the nut. The nut 12 usually has a cylindrical shape, though the shape of the nut has also been rectangular. Indeed the nut may assume any one of a number of shapes since the shape of the nut is not critical. The cavity 14 also has a cylindrical shape and is usually positioned concentrically within the nut 12.

The nut 12 is formed to include an upper counterbore 18 located at the top of the nut cavity 14 and a lower counterbore 19 located at the bottom of the nut cavity. The counterbores 18, 19 are cylindrical holes machined concentric with the outer diameter of the nut 12. The bores 18, 19 have diameters larger than the diameter of the cavity 14. The depth of the counterbores 18, 19 is generally shallow, as shown in FIG. 3.

The assembly 10 further includes cavity closing means generally indicated at 54 for temporarily extending across the bottom end of the cavity 14 and rendering the bottom end fluid-tight. The cavity closing means 54 can involve any structure which closes the nut cavity 14 in such a way as to allow the polymer 30 to be retained in the cavity before and after the casting screw 42 is inserted, and while the polymer is curing. The cavity closing means 54 is specifically defined as the lower screw support member 54, which is adapted to fit with close tolerance into the lower counter bore 19 of the nut 12. The lower support member 54 has a cylindrical portion 56 which engages telescopically in the counter bore 19.

The polymer 30 may be any polymer having the necessary strength, lubricity, wearability, and flexibility for forming threads for use in a nut drive and lead screw assembly.

The cavity 14 of the nut 12 includes polymer retaining means 20 for retaining the polymer insert 30 in the cavity 14 of the nut 12 after the polymer has cured. The polymer retaining means 20 is intended to resist forces which may move the polymer insert 30 through or around the nut cavity 14. The polymer retaining means 20 functions by eliminating the smooth surface of the nut cavity 14. The polymer retaining means 20 is defined as helical right and left hand threads formed in the surface of the nut cavity 14.

The nut casting apparatus 10 further includes a casting screw generally indicated at 42 for forming the threads 32 of the nut 12 complementary to the threads 44 of the casting screw. The casting screw 42 may be any screw having a dimension and thread pattern similar to those of the lead screw (not shown). Preferably, the casting screw 42 is taken from a length of a lead screw from a production run of lead screws to be used with nuts in the nut drive and lead screw shuttle assemblies. The casting screw 42 used for casting the nut threads 32 is ideally an end length of the actual multi-start high-helix lead screw (not shown) to be used in the nut drive and lead screw shuttle assembly for which the nut 12 is cast. For example, if a ten foot lead screw is needed for a shuttle assembly, a twelve foot screw will be procured. Two feet of the lead screw will be removed to form the casting screw 42 used for casting the nut threads 32. Taking a length of the lead screw for the casting screw 42 ensures that the threads 32 formed in the polymer 30 will closely match the threads of the lead screw.

The casting screw 42 includes a convex tip 46 for resisting the collection of air bubbles under the tip of the screw as the screw is lowered into the polymer 30. The tip 46 must be formed on the casting screw 42 prior to using the screw 42 in the casting process.

The casting screw 42 further includes polymer shrinkage compensating means (not shown) for reducing the shrinking effect on the formation of the polymer threads 32. Since all polymers shrink somewhat while curing, it is necessary either to reform the threads after curing or to compensate for the shrinkage. At least one of these measures is necessary to provide suitable clearance for the lead screw. Reforming the threads 32 after curing is difficult and expensive; so compensating for polymer shrinkage is preferred. The polymer shrinkage compensating means is generally nickel plating on the threads 44 of the casting screw 42. The plating provides for extra clearance of the unplated lead screw after the polymer 30 has shrunk. Electroless nickel plating is used to coat the casting screw 42 because nickel provides an even coating on the screw. Metals such as chrome provide a less uniform coating. The plating is formed onto the casting screw 42 to a desired thickness. The thickness of the plating depends upon the amount of shrinking that is expected from the polymer 30. However, the maximum plating thickness achievable with current methods is 5/1000 of an inch.

The casting screw 42 is formed to include opposing flats 48 located on the top end of the casting screw for allowing a tool to be applied to remove the casting screw from the polymer 30 when the polymer is cured.

The nut casting apparatus 10 as set forth further includes screw support means generally indicated at 52, 54 for supporting the casting screw 42 in the polymer 30. The screw support means 52, 54 includes a lower support member 54 and an upper support member 52.

The lower support member generally indicated at 54 includes lower screw centering means 58, a concave portion 57 and a lower cylindrical portion 56. The lower screw centering means 58 centers the casting screw 42 in the nut cavity 14. The lower centering means 58 is defined as a lower locating counterbore 58 machined in the lower support member 54 for receiving and engaging the outer diameter of the screw 42 as the screw passes through the counterbore 58. The lower locating counterbore 58 is centered in the lower cylindrical portion 56 of the lower support member 54. The lower cylindrical portion 56 is integral with the lower support member 54. The concave portion 57 of the lower centering means 58 provides clearance for the convex tip 46 of the screw 42. The concave portion 57 is centered in the cylindrical portion 56 of the lower support member 54 just below the lower locating bore 58.

The upper screw support member generally indicated at 52 includes upper screw centering means 62 and an upper cylindrical portion 68. The upper centering means is defined as an upper locating bore 62 for receiving and engaging the outer diameter of the casting screw 42 as the casting screw passes through the bore 62. The upper support member 52 includes an upper cylindrical portion 68 integral with the upper support member 52 and adapted to engage telescopingly with close tolerance in the upper counter bore 18 of the nut 12. The upper locating bore 62 is centered with respect to the upper cylindrical portion 68, and extends completely through the upper support member 52. When the screw 42 passes through both the upper locating bore 62 and the lower locating counterbore 58 it will be centered with respect to the nut cavity 14. The upper screw support member 52 also includes an excess polymer cavity 64 for receiving excess polymer 30 from the cavity 14. The excess polymer cavity 64 is cylindrical in shape and extends from the top of the nut cavity 14 to the upper locating bore 62. The excess polymer cavity 64 may be centered with respect to the upper cylindrical portion 68 and the upper locating bore 62. The upper support member 52 further includes opposing scallops 66 recessed in the upper locating bore 62 for receiving further excess polymer escaping from the nut cavity 14.

In the case where the nut 12 to be cast is large, the amount of polymer 30 displaced by the screw 42 may force the upper and lower support members 52, 54 from engagement in the upper and lower counterbores 18, 19, respectively. To prevent this problem, retaining means 70 may be provided to retain the support members 52, 54 in engagement with the nut 12. The retaining means 70 secures the upper and lower support member 52, 54 to each other so that the upper and lower cylindrical portions 56, 68 are retained in telescoping engagement in said upper and lower counter bores 18, 19, respectively. Preferably, the upper and lower support members 52, 54 are secured to each other with the tie rods 80 and the nuts 90. The upper support member 52 includes at least two holes 84 for allowing the tie rods 80 to pass through. The lower support member 54 includes at least two threaded bores 86. The threads 82 typically run along the entire length of the tie rod 80. The threads 82 must at least run along the top and bottom ends of the tie rod 80.

The method for forming threads on the interior cavity 14 extending through the nut 12 for engaging a multi-start high helix lead screw of a nut drive and lead screw assembly generally comprises the steps of: closing the bottom of the cavity 14 of the nut 12 to render the bottom fluid-tight; thereafter filling the cavity 14 with a viscous polymer material 30; thereafter inserting a casting screw 42 having the threads thereabout into the cavity 14 to displace the polymer material 30; curing the polymer material 30 and forming the threads 32 of the nut 12 complementary to the threads 44 of the casting screw 42 for providing polymer nut threads 32 having no air bubbles or open pockets.

The method first involves closing the bottom end of the cavity 14 of the nut 12. The lower screw support member 54 is coated with release agent to allow for easy removal from contact with the nut 12 at the end of the process. The release agent may be any suitable release agent which prevents an object from adhering to the polymer 30 after the polymer has cured. The lower screw support member 54 is then fitted into the lower counter bore 19 of the nut 12, thereby closing the bottom of the cavity 14 of the nut.

The upper support member 52 may next be coated with release agent and fitted into the upper counter bore 18 of the nut 12. This step may be performed as late as just after inserting the casting screw 42 into the polymer 30.

Next, the polymer 30 should be mixed in preparation for the dispensing of the polymer into the nut cavity 14. This mixing generally introduces unwanted air bubbles into the polymer 30.

The method next includes the step of applying a force to the liquid polymer 30 to remove the air bubbles therefrom. Specifically, this entails centrifuging the polymer 30. The centrifuging is performed prior to introducing the polymer 30 to the nut cavity 14.

When threads 32 are formed in large sized nuts 12, the amount of polymer 30 displaced by the screw 42 may force the upper and lower support members 52, 54 from engagement in the upper and lower counterbores 18, 19, respectively. To prevent this problem, retaining means 70 may be provided to retain the support members 52, 54 in engagement with the nut 12. To retain the upper and lower support members 52, 54 to the nut 12, first the tie rods 80 are threaded into the threaded bores 86 on the lower support member 54. Next, the nut 12 may be lowered onto the lower support member 54 so that the lower cylindrical portion 56 engages telescopingly within the lower counter bore 19 of the nut 12. Next, the upper support member 52 is lowered over the tie rods 80 so that the tie rods 80 pass through the holes 84. The upper support member engages fully with the nut 12 so that the upper cylindrical portion 68 engages telescopingly within the upper counter bore 18. Finally, the tie nuts 90 are disposed on the tie rods 80 and threaded down along the threads 82 until the nuts 90 tightly abut against the upper support member 52. Retaining the support members 52, 54 to the nut is not necessary when using generally smaller nuts.

Once the air bubbles are removed, the polymer 30 is introduced into the nut cavity 14. Preferably, the polymer 30 is injected into the cavity 14.

Since the polymer 30 shrinks during curing, steps must be taken to compensate for the shrinkage or to reform the threads 32 after shrinkage. If no steps are taken to minimize the effects of the polymer shrinkage, the lead screw will lack proper clearance to move through the threads 32 formed in the nut 12. Since reforming the threads 32 is difficult and time consuming, compensating for the polymer shrinkage is preferred. In compensating for the polymer shrinkage, it is desirable to use a casting screw 42 with larger thread dimensions than the lead screw so that when the polymer 30 shrinks, the polymer threads 32 will still provide enough clearance for the lead screw to pass through. The novel way of producing such a casting screw 42 is to use a length of the actual lead screw which will be used with the nut whose threads are being cast, and to coat this casting screw 42 with a metal coating. The preferred metal coating is nickel plating since the nickel coats evenly over the threads of the casting screw 42. The nickel can be coated as thickly on the casting screw 42 as desired. The coating is usually under 5/1000 of an inch, since this is the maximum coating achievable with current methods. The thickness of the nickel coating depends on the amount of shrinking expected from the polymer 30.

After the polymer 30 is introduced into the nut cavity 14, the casting screw 42 is next coated with release agent and lowered down through the screw locating bore 62 and into the polymer. As the casting screw 42 is lowered slowly down into the polymer 30, it is rotated in the threaded direction to avoid the formation or inclusion of air bubbles in the polymer 30. The "threaded direction" is the direction the casting screw 42 would be rotated to screw the screw into a solid object.

Once the casting screw 42 is inserted in the polymer 30 the casting screw should be aligned centrally within the nut cavity 14 in order to leave an annular space thereabout containing the polymer material 30. This involves ensuring that 1) the screw 42 passes through the upper locating bore 62, 2) the screw passes through the lower locating bore 58, and 3) the convex tip 46 of the screw 42 fits correctly into the concave portion 57.

Next, the polymer 30 is allowed to cure in the cavity 14 of the nut 12 around the threads 44 of the casting screw 42.

Once the polymer 30 has cured, the casting screw 42 may be removed from the nut 12. Pliers or some other suitable tool may be applied to opposing flats 48 on the head of the casting screw 42 to rotate the screw out of the polymer insert 30. This step and the preceding step may be interchanged.

Finally, the upper and lower support members 52, 54 may be removed from the nut 12. The upper and lower screw support members 52, 54 can be re-used in other nut casting operations.

After some finishing work on the nut 12, including machining and cleaning, the nut should be ready for use with the lead screw. The product of this process is a nut 12 having polymer threads 32 which are securely retained within the nut and which have almost no surface imperfections.

What is claimed:

1. A nut casting apparatus (10) for forming threads (32) on the interior cavity (14) extending through a nut casing (12) for engaging a multi-start high helix lead screw of a nut drive and lead screw shuttle assembly by filling the cavity (14) with a viscous polymer (30), inserting a casting screw (42) having multi-start high helix threads (44) into the cavity (14) to displace the polymer (30), curing the polymer (30) and forming the threads

(32) in the polymer (30) complementary to the threads (44) on the casting screw (42), said apparatus (10) comprising:
   a threadless nut casing (12) having interior walls defining an interior cavity (14) extending between top and bottom ends of said nut casing so that said nut casing is open at said top and bottom ends;
   a cavity closing member (54) separate from said nut casing (12) extending across said bottom end of said cavity (14) and rendering said bottom end fluid-tight whereby said nut casing (12) and said cavity closing member (54) define a cup for retaining a liquid introduced into said cavity through said top end of said nut, said cavity closing member including support means for supporting the casting screw when the casting screw is inserted into the nut casing through the liquid; and
   a casting screw (42) having a top end and a bottom end, and multi-start high helix threads (44) for forming the threads (32) in said nut casing (12) complementary to said threads (44) on said screw, said casting screw being disposed in said interior cavity (14) and extending completely through said nut casing (12) so that said bottom end of said screw abuts and is supported by said support means on said closing member (54), said casting screw being spaced apart radially from said interior walls of said nut casing (12) to define a space to be occupied by the polymer (30).

2. A nut casting apparatus (10) as set forth in claim 1 wherein said casting screw (42) includes a convex tip (46) disposed on said bottom end of said screw for resisting the collection of air bubbles under said tip of said screw as said screw is lowered into the polymer (30), said convex tip abutting and being supported by said support means on said closing member (54).

3. A nut casting apparatus (10) as set forth in claim 2 wherein said casting screw (42) includes polymer shrinkage compensating means for compensating for the shrinking effect of the polymer (30) on the formation of the polymer threads (32).

4. A nut casting apparatus (10) as set forth in claim 2 wherein said polymer shrinkage means includes nickel plating on said threads (44) of said casting screw (42).

5. A nut casting apparatus (10) as set forth in claim 4 including an upper support member (52) for supporting said top end of said casting screw (42) in said cavity (14) of said nut casing (12).

6. A nut casting apparatus (10) as set forth in claim 5 including screw centering means (58,62) for centering said casting screw (42) in said nut cavity (14).

7. A nut casting apparatus (10) as set forth in claim 6 wherein said screw centering means includes in said closing member (54) a lower locating counterbore (58) for receiving and supporting said casting screw (42).

8. A nut casting apparatus (10) as set forth in claim 1 wherein said support means of said closing member (54) includes a concave portion (57) for receiving and supporting said convex tip (46) while providing clearance for said convex tip (46) of said screw (42).

9. A nut casting apparatus (10) as set forth in claim 8 wherein said screw centering means includes in said upper screw support member (52) a screw locating bore (62) for engaging and centering said casting screw (42).

10. A nut casting apparatus (10) as set forth in claim 9 wherein said upper support member (52) includes an excess polymer cavity (64) for receiving excess polymer (30) escaping from said nut cavity (14).

11. A nut casting apparatus (10) as set forth in claim 10 wherein said upper support member (52) includes opposing scallops (66) recessed in said locating bore (62) for receiving excess polymer (30) escaping from said nut cavity (14).

12. A nut casting apparatus (10) as set forth in claim 11 comprising polymer retaining means (20) for retaining the cured polymer threads (32) in said cavity (14) of the said nut (12).

13. A nut casting apparatus (10) as set forth in claim 12 with said polymer retaining means (20) being defined as scoring in the surface of said nut cavity (14).

14. A nut casting apparatus (10) as set forth in claim 13 wherein said nut casing (12) includes an upper counterbore (18) located at said top end of said nut cavity (14).

15. A nut casting apparatus (10) as set forth in claim 14 wherein said nut casing (12) includes a lower counterbore (19) located at said bottom end of said nut cavity (14).

16. A nut casting apparatus (10) as set forth in claim 13 with said upper screw support member (52) being adapted to fit in said upper counterbore (18) of said nut casing (12).

17. A nut casting apparatus (10) as set forth in claim 16 with said lower support member (54) being adapted to fit in said lower counterbore (19) of said nut casing (12).

18. A nut casting apparatus (10) as set forth in claim 17 wherein said lower screw support member (54) includes an integral lower cylindrical portion (56) for telescoping engagement in said low counterbore (19) of said nut casing (12).

19. A nut casting apparatus (10) as set forth in claim 18 with said lower screw centering means (58) being centered in said cylindrical portion (56) of said lower support member (54).

20. A nut casting apparatus (10) as set forth in claim 19 wherein said upper screw support member (52) includes an integral upper cylindrical portion (68) for telescoping engagement in said upper counterbore (18) of said nut casing (12).

21. A nut casting apparatus (10) as set forth in claim 20 with said upper screw centering means (62) being centered in said cylindrical portion (68) of said upper support member (52).

22. A nut casting apparatus (10) as set forth in claim 21 wherein said casting screw (42) includes opposing flats (48) disposed on said top end of said screw for allowing a tool to be applied to remove said screw from the casting.

23. A nut casting apparatus (10) as set forth in claim 21 comprising retaining means (70) for retaining said support members (52,54) in engagement with said nut casing (12) while said polymer (30) cures, whereby said upper and lower cylindrical portions (56,58) are retained in said telescoping engagement in said upper and lower counter bores (18,19) respectively.

24. A nut casting apparatus (10) as set forth in claim 23 wherein said retaining means (70) includes tie rods (80) and tie nuts (90) for retaining said support members (52,54) in engagement with said nut casing (12) by fastening said support members (52,54) to each other when said upper support member (52) is disposed in said upper counter bore (18) of said nut casing (12) and when said lower support member (54) is disposed in said lower counter bore (19) of said nut casing (12).

* * * * *